United States Patent
Hahn et al.

(10) Patent No.: US 7,911,312 B2
(45) Date of Patent: Mar. 22, 2011

(54) MAGNET POLE FOR MAGNETIC LEVITATION VEHICLES

(75) Inventors: Wolfgang Hahn, Kassel (DE); Qinghua Zheng, Taufkirchen (DE); Luitpold Miller, Ottobrunn (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 1204 days.

(21) Appl. No.: 10/584,897

(22) PCT Filed: Feb. 5, 2005

(86) PCT No.: PCT/DE2005/000218
§ 371 (c)(1),
(2), (4) Date: Jun. 28, 2006

(87) PCT Pub. No.: WO2005/087533
PCT Pub. Date: Sep. 22, 2005

(65) Prior Publication Data
US 2009/0174511 A1    Jul. 9, 2009

(30) Foreign Application Priority Data
Mar. 9, 2004   (DE) .................. 10 2004 011 941

(51) Int. Cl.
*H01F 27/28* (2006.01)
(52) U.S. Cl. ......... 336/223; 336/213; 336/222; 336/225
(58) Field of Classification Search .................. 336/230, 336/231, 213, 222, 223, 225
See application file for complete search history.

(56) References Cited

U.S. PATENT DOCUMENTS

| | | | |
|---|---|---|---|
| 2,377,420 A * | 6/1945 | Hill | 323/355 |
| 3,436,704 A * | 4/1969 | Palumbo et al. | 336/70 |
| 3,467,931 A * | 9/1969 | Dutton | 336/180 |
| 3,546,644 A * | 12/1970 | Michel et al. | 336/223 |
| 4,395,693 A * | 7/1983 | Marinescu | 336/223 |
| 5,274,904 A * | 1/1994 | Proise | 29/602.1 |
| 5,508,674 A * | 4/1996 | Girgis et al. | 336/187 |
| 6,535,100 B2 * | 3/2003 | Forss | 336/225 |
| 6,629,358 B2 | 10/2003 | Setiabudi et al. | |
| 6,888,436 B1 | 5/2005 | Yagasaki | |
| 2001/0001895 A1 | 5/2001 | Setiabudi | |

FOREIGN PATENT DOCUMENTS

| | | |
|---|---|---|
| CN | 1290018 | 4/2001 |
| JP | 55-163819 | 12/1980 |
| JP | 09 246037 | 9/1997 |
| JP | 11 111084 | 4/1999 |
| WO | 97/30504 | 8/1997 |

* cited by examiner

*Primary Examiner* — Anh T Mai
*Assistant Examiner* — Joselito Baisa
(74) *Attorney, Agent, or Firm* — Michael J. Striker

(57) ABSTRACT

A magnetic pole for magnetic levitation vehicles is described which pole comprises a core (1) and a winding (16) applied on it in form of a disc which is formed by a conductor strip (17) wound in several layers (10a) . . . 10k) around said core (1). According to the present invention, the conductor strip (17) is properly tailor-cut at its longitudinal rims (17a, 17b) so that its width increases from said core (1) towards the outside until it reaches a maximum value (b2).

8 Claims, 5 Drawing Sheets

MAGNET POLE FOR MAGNETIC LEVITATION VEHICLES

The present invention relates to a magnet pole according to the preamble of Claim 1.

Magnetic poles of this type are used with magnetic levitation vehicles in various applications, e.g. as parts of carrier, guidance, or brake magnets. Up to now, these magnet poles have been made of an iron core lying on a mass potential and a winding applied on it, said winding being formed of layers of a conductor and an isolator arranged in alternating succession (PCT WO 97/30 504). The conductors and isolators are comprised of band-shaped and/or strip-shaped materials, e.g. aluminum bands and thin insulating foils. Moreover, an insulation layer laid around the core shell is usually provided between the first layer of the conductor strip bordering the core and the core itself.

On account of the mainly rectangular shape of the conductor strip, its longitudinal edges bordering the core lead to a sharp-edged winding geometry that entail a concentration of the electrical field intensity and point discharges at these areas when the magnet pole is used. Furthermore, since high voltage rates reaching into a range of kilovolts occur in these areas, damage to insulation rendering the magnet pole useless cannot be safely avoided. This comes to bear in particular if a multitude of magnet poles in carrier or guidance magnet systems is switched in series and if parasitary capacities combined with inductivities of the magnet poles lead to non-desired resonance oscillations.

Now, therefore, it is the object of the present invention to reduce and/or even entirely avoid field intensity concentration occurring at points or the like with a magnet pole of the species described hereinabove.

The characterizing features of Claim 1 serve to solve this object.

The present invention bears the advantage in that a preselected winding geometry is enforced in the area bordering the core by properly cutting the conductor strip, because of which sharp-edged lateral edges of the conductor strip layers close to the core are concealed by the layer lying farther away from the core and thus rendered innocuous.

Other advantageous features of the present invention become evident from the subclaims.

Embodiments of the present invention will be explained hereinafter in more detail and based upon the drawings attached hereto, in which FIG. 1 shows a perspective view of applying a winding on a conventional magnet pole comprised of a core and a mono-disk winding;

Figure 1:
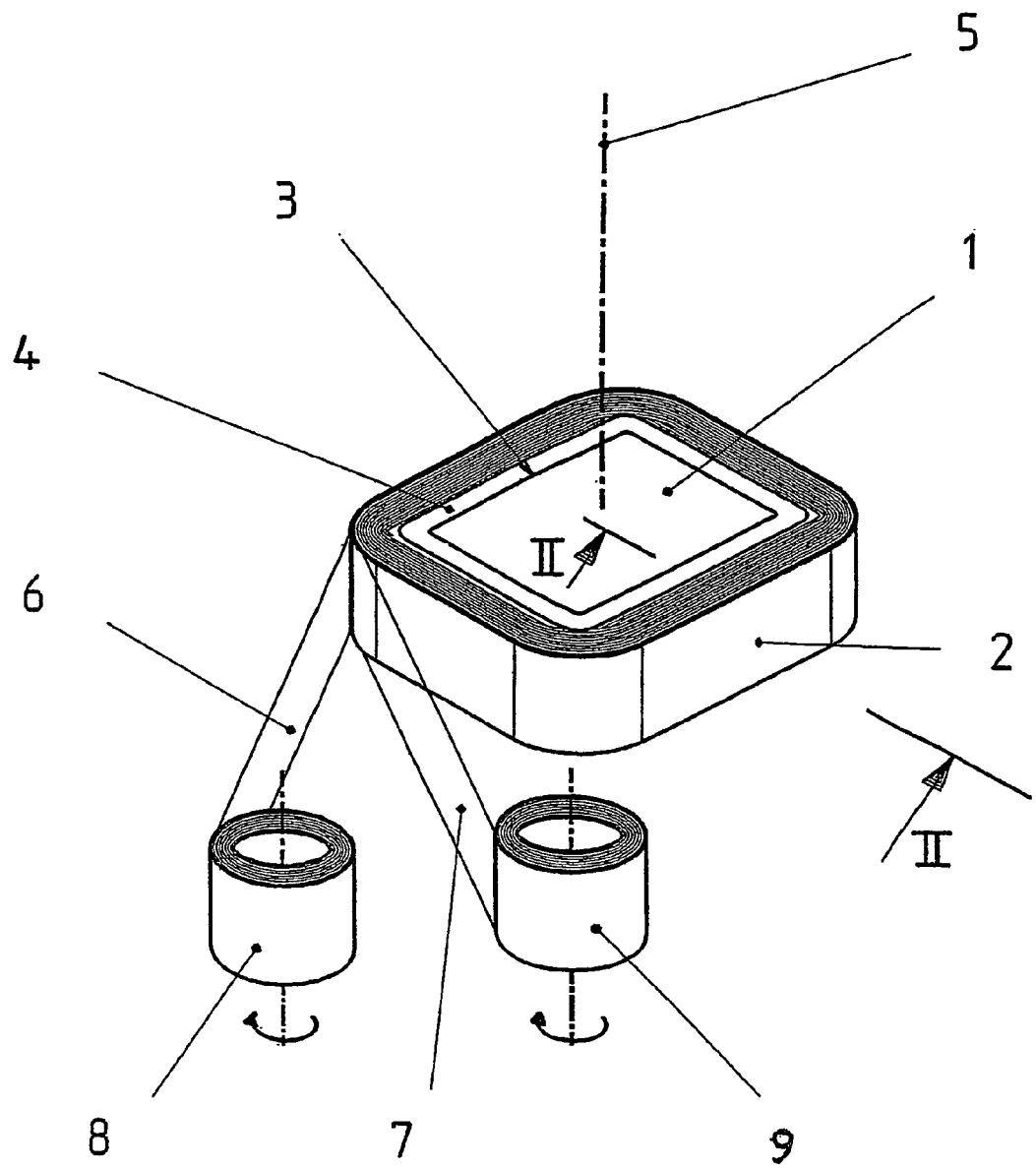

A magnetic pole of the type being of interest hereunder according to FIG. 1 is comprised of an iron core 1 consisting of a metal sheet pack, preferably square-shaped, with rounded-off corners and a winding 2 applied on it. The production of the core 1 can be done in many different ways and is of no importance for the present invention. Moreover, said core 1 can be provided with a circumferential insulation layer 3 abutting its shell surface, said insulation layer is comprised of an insulating material, e.g. made of plastic, and may also be configured as a winding carrier, which is provided with assembly flanges 4 in between of which the winding 2 comes to lie. The insulation layer 3 serves for both the assembly of said winding 2 and the electrical insulation of winding 2 towards said core 1 in radial direction relative to a center and coiling axis 5 of said core 1.

For example, the winding 2 is formed of layers from a conductor strip 6 (e.g. made of aluminum) arranged in alternating succession and of other insulation layers 7 arranged between them in the form of an insulating foil or the like which electrically insulates these layers against each other in a radial direction. In manufacturing said magnet pole 1, the conductor strips 6 and the insulation layers 7 are reeled-off in well-known manner from supply coils 8, 9, and wound coaxially around the center axis 5 onto said core 1. Henceforth, the winding 2 thus obtained is comprised of a disc running coaxially to the center axis 5 and having a multitude of layers in radial direction.

Figure 2:
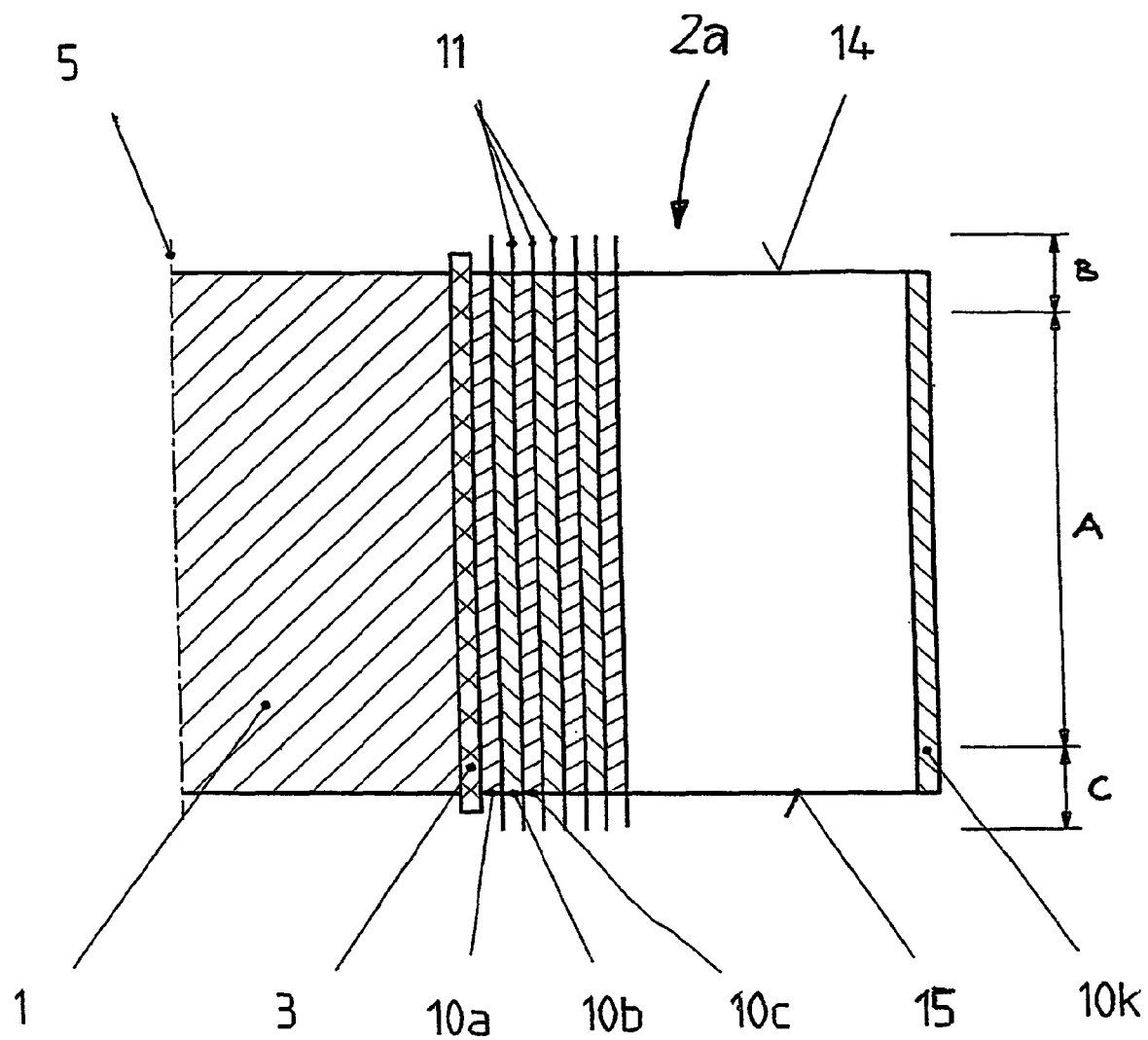
FIG. 2 shows a schematic view of the winding geometry of one half of the magnet pole according to FIG. 1 in an area bordering the core as a partial section along line II-II of FIG. 1.

A magnetic pole according to FIG. 2, showing a winding section 2a lying on the right side of center axis 5, has a multitude of layers 10, which for example are individually designated with reference numerals 10a to 10k. Accordingly, layer 10a rests immediately at core 1 and/or insulation layer 3. Between the individual layers 10 there are insulation layers 11 each indicated by lines that electrically insulate the layers 10 against each other in radial direction.

The innermost layer 10a and the outermost layer 10k are provided with electrical connections not shown here that serve for applying a terminal voltage.

The magnetic pole has a height that is measured in parallel to the center axis 5 and between two longitudinal edges 14 and 15 of the conductor strip forming the layers and thus corresponds to the width of the conductor strip. A central section of the conductor strip designated in FIG. 2 with letter A is comparably uncritical with regard to peak field strength. Conversely, sections designated with letters B and C and extending at both sides each of longitudinal rims 14, 15 of the conductor strips are distinguished by edges and tips that may cause uncontrollable high concentration of electric field intensity. On the one hand this is due to sharp cutting edges of the conductor strip bordering the longitudinal rims 14, 15 and on the other hand due to tolerances in height and inaccuracies in applying the winding on the core 1. This all may lead to meander-like and sawtooth-like contours with very small radii in the area of longitudinal rims 14, 15 that cause the interferences in the areas close to core 1 as described hereinabove.

Figure 3:
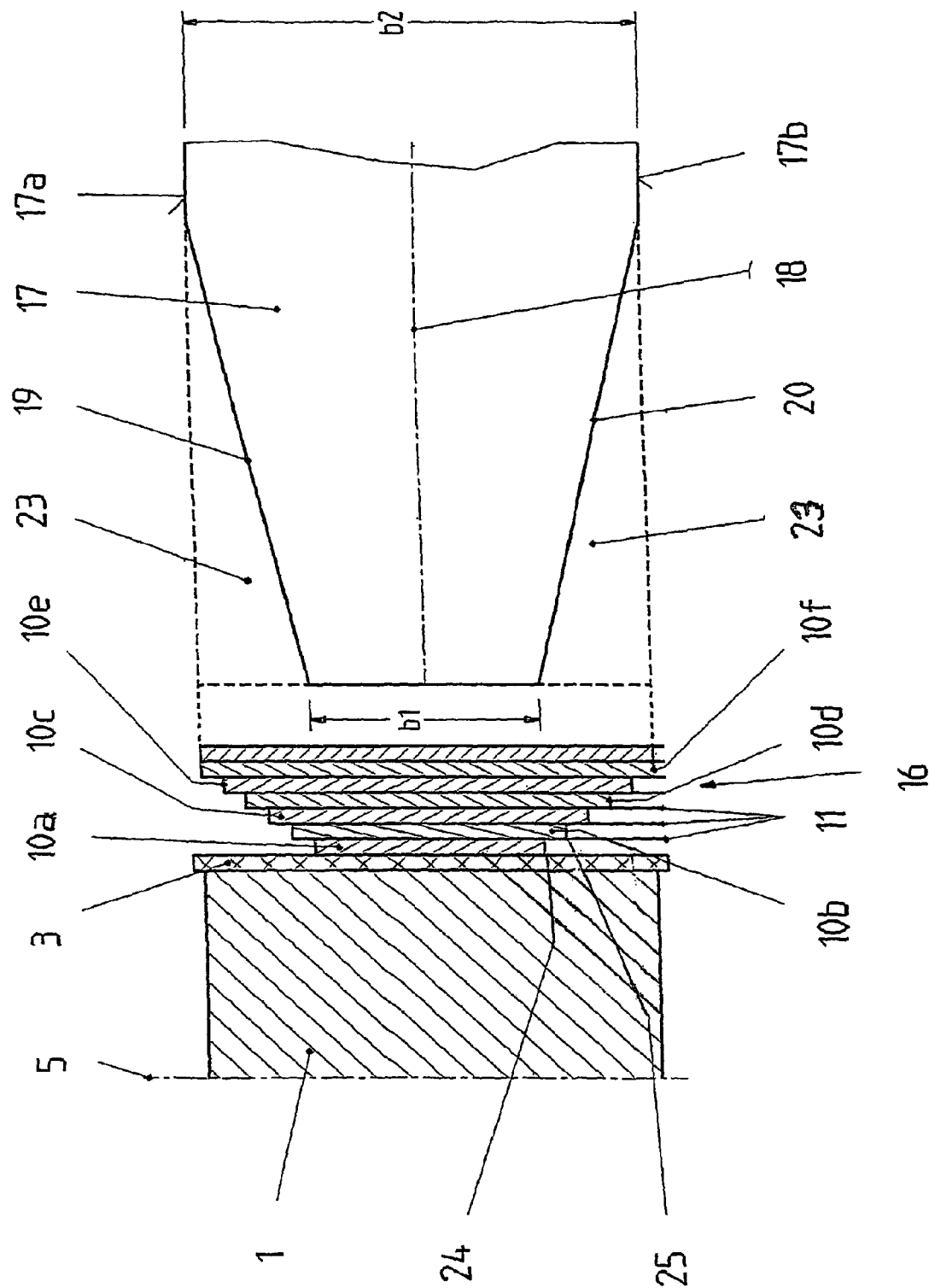
FIG. 3 shows a partial section corresponding to FIG. 2, though enhanced, through a magnet pole with a winding geometry according to the present invention.

According to the present invention, the magnetic pole is therefore configured according to FIG. 3. It mainly differs from the magnet pole according to FIG. 1 and FIG. 2 in that its winding 16 is made of a conductor strip 17, which in the area abutting said core 1 is of a wedge shape and properly cut so that its width measured in parallel to the center axis 5 from said core 1 towards the outside gradually increases from a mean value b1 up to a maximum value b2 which substantially corresponds to the core height. Apart from the section shown in FIG. 2, FIG. 3 additionally shows a top view on a part of the conductor strip 17 provided with the tailored cut. Rather than only at the free end of conductor strip 17 located radially outside, the said maximum value b2 is already achieved, as viewed in the direction of a longitudinal axis 18 of said conduction band 17 running vertically to the center axis 5, preferably after a length that corresponds to a number of layers 10a, 10b, etc. which is smaller, preferably much smaller, than the total number of the existing layers 10. Assuming there are 100 up to 300 layers 10, the maximum value b2 may for example already be reached after a maximum of approx. ten layers 10.

Taking the embodiment according to FIG. 3, the maximum value b2 is already reached after approx. six layers, i.e. at layer 10f. From this point on, the width of the conductor strip 17 will constantly correspond to the value b2.

The increasing width of conductor strip 17 is achieved by a tailor-cut of its longitudinal rims 17a, 17b in a section lying close to said core 1, said tailor-cut running along straight lines 19, 20 as shown in FIG. 3. Alternatively, a tailor-cutting of longitudinal rims 17a, 17b can also be accomplished along continuously running curves 21, 22 which any expedient shape may be assigned to.

As a result of cutting the lateral rims 17a, 17b by forming triangular waste pieces 23 and/or corresponding recesses as shown on FIG. 3 in dashed lines, layers 10a, 10b ... 10k attain a gradually increasing height. The slope of the straight lines 19,20 and/or curves 21,22 is advantageously so chosen that only corners and/or sharp edges (e.g. 24,25 in FIG. 3) of the first layers are allocated to said core 1 which corners and edges are already covered in planar form by the following layer. For example, edge 24 of layer 10a is covered by layer 10b, edge 25 of layer 10b is covered by layer 10c, etc., whereby detrimental point discharges are largely reduced. This is particularly true in view of the circumstance that the conductor strips 17 are comparatively thin (e.g. 0.2 mm) and therefore the field strength concentrations with plate/tip combinations occurring here are at least three times as big as those in a plate/plate combination. Moreover, by way of the configuration of tailored cuts as described hereinabove it can be assured that the smallest width b1 of conductor strip 17, considering the geometry serving for the coverage as described before, is only so much smaller than the maximum width b2 as is required to prevent the enhancement of the ohmic resistance associated therewith from entailing any significant disadvantages with respect to the dissipation of heat loss via said core 1 in radial direction.

Figure 4:
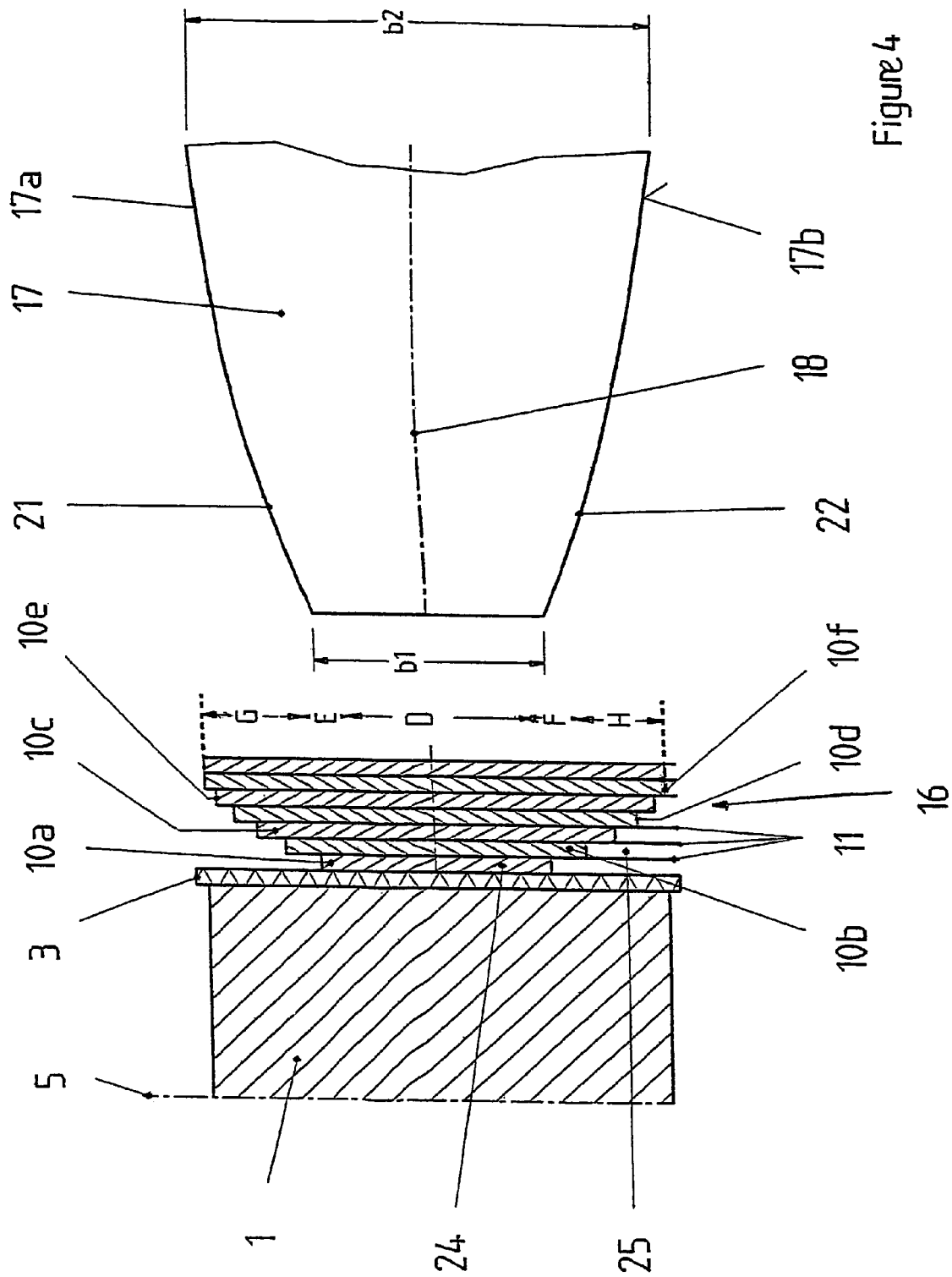
FIG. 4 shows another embodiment of the magnet pole according to the present invention in a partial section according to FIG. 3.

The advantages achieved with the present invention become particularly evident from FIG. 4 into which zones D to H are drawn analogously to FIG. 2. Accordingly, zone D is non-critical as is zone A in FIG. 2. Zones E and F designate two zones which are analogous to zones B and C in FIG. 2, but which here designate an area with a reduced field strength load. Zones G and H, too, are widely non-critical because the field strength load in these zones decreases gradually.

Figure 5:
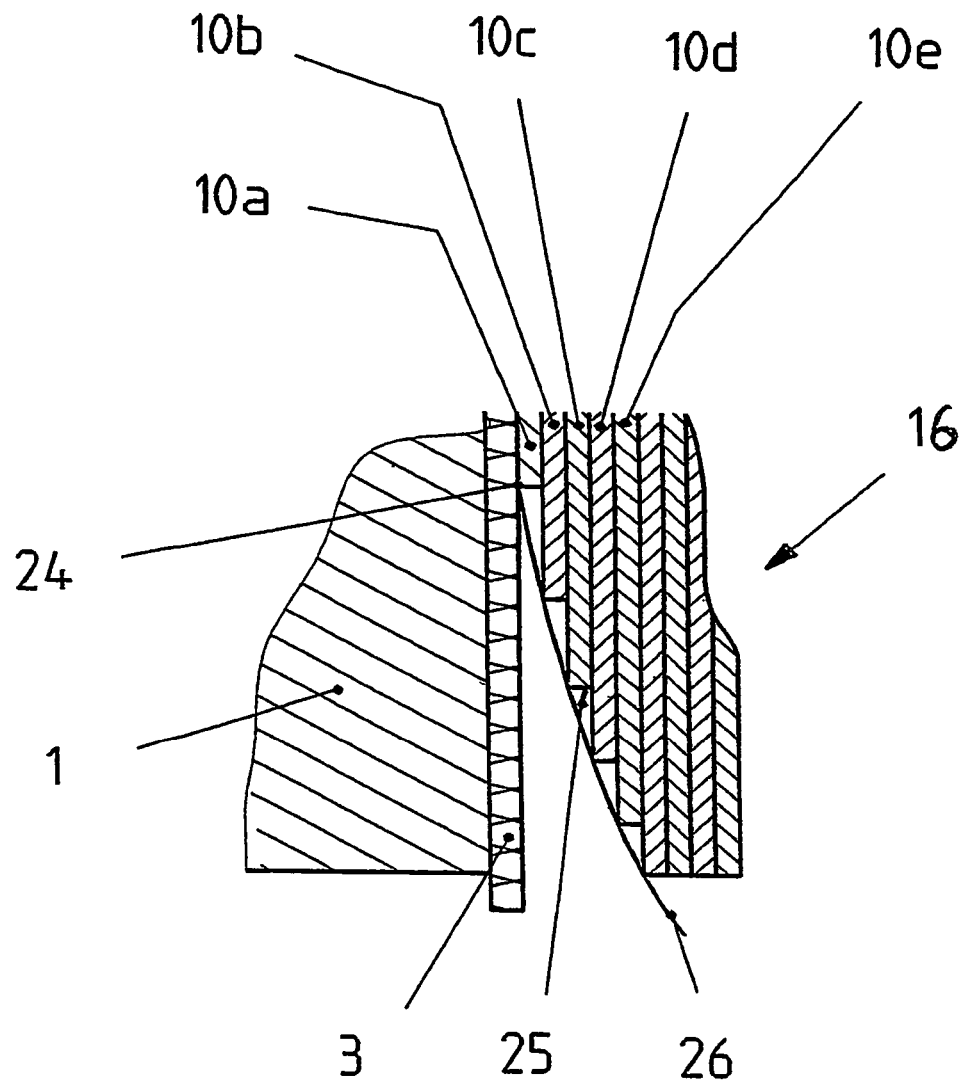
FIG. 5 shows a third embodiment of the magnet pole according to the present invention in a partial section according to FIG. 3 and FIG. 4.

Other advantages of the present invention lie in the fact that higher operational safety, reduction in ageing effects, and enhancement in nominal values for corona and partial discharges are obtained by avoidance of insulation breakthroughs. Apart of this it is perfectly clear that the geometry of the stepped shape shown in FIG. 3 and FIG. 4 in the area of the first layers 10a to 10e in principle can be chosen optionally and largely be adapted to magnetic requirements. Furthermore, it is possible to provide a continuous, partially conductive foil 26 between the insulation layer 3 of said core 1 and the first layer 10a pursuant to FIG. 5, said foil, for example, being comprised of an organic insulation substance mixed with carbon black and capable of dissipating capacitive currents while not allowing operating currents to pass through. After applying the winding on core 1 according to FIG. 5, foil 26 can be laid against the edges and corners 24, 25, etc. in order to thus obtain a rounding-off and homogenization of the stepped areas near said core 1 and to further reduce the risk of peak discharges.

Finally, it is a particular and essential advantage of the present invention that the insulation layer 3 wound around said core 1 need not be thicker than usual what would also be possible to avoid insulation faults. This would also avoid insulation ruptures, but also make it more difficult to dissipate the heat loss generated in winding 17 via core 1.

According to the present invention, the rims 17a, 17b of the conductor strip 17 can be equally or differently cut and/or bordered. It is especially advantageous to cut the longitudinal rims 17a, 17b mirror-symmetrically to the longitudinal axis 18 of conductor strip 17.

The present invention is not limited to the embodiments described herein that can be varied in a plurality of ways. This is especially applicable to the shape of the lines 19, 20 and/or 21/22 and/or the waste pieces 23 chosen in an individual case and possibly obtained by way of optimization measures. Furthermore, it is possible to configure the magnet pole by means of two or more discs lying one above each other in the direction of the center axis 5 and separated by further insulation layers, in which case each disc would be configured according to FIG. 3 to FIG. 5 and consist of conductor strips correspondingly cut near the core. It is considered self-evident that the different features can also be applied in combinations other than those outlined and described hereinabove.

The invention claimed is:

1. A magnetic pole for magnetic levitation vehicles, comprising a core (1) with a center axis (5) and a winding (16) in form of a disk having multiple of layers (10) in a radial direction applied on the core (1), said winding being formed by a conductor strip (17) wound around said core (1) to form said multiple layers (10), wherein said conductor strip (17) at its longitudinal rims (17a, 17b) placed at a distance in a direction of the center axis (5) is so tailor-cut that its width increases steadily from the core (1) towards an outside until the width reaches a maximum value (b2).

2. A magnetic pole according to claim 1, wherein the maximum value (b2) of the width, viewed in a longitudinal direction of the conductor strip (17) is reached after a length that corresponds to a number of layers (10) which is smaller than a number of said multiple layers (10) provided in total (10a ... 10k).

3. A magnetic pole according to claim 2 wherein the maximum value (b2) of the width is reached after a length of the conductor strip band (17) that corresponds to substantially ten layers (10).

4. A magnetic pole according to claim 1, wherein the longitudinal rims (17a, 17b) of said conductor strip (17) are mirror-symmetrically tailor-cut with respect to a longitudinal axis (18) extending perpendicularly to the center axis (5) of said conductor strip (17).

5. A magnetic pole according to claim 1, wherein the longitudinal rims (17a, 17b) are tailor-cut along straight lines (18, 19).

6. A magnetic pole according to claim 1, wherein the longitudinal rims (17a, 17b) are tailor-cut along continuous curves (20, 21).

7. A magnetic pole according to claim 1, wherein said core (1) at its shell surface is wrapped by an insulation layer (3) and a partially conductive foil (26) is located between said insulation layer (3) and a layer (10a) of said disc bordering it, said partially conductive foil resting against steps (24, 25) formed between said individual layers (10) being formed by tailor-cutting of said conductor strip (17).

8. A magnetic pole according to claim 1, wherein it is at least one further disc with multiple layers (10) formed of one conductor strip (17), and wherein said conductor strips (17) of all discs are tailor-cut.

* * * * *